United States Patent
Liu et al.

(10) Patent No.: US 9,684,080 B2
(45) Date of Patent: Jun. 20, 2017

(54) LOW-ENERGY GPS

(75) Inventors: Jie Liu, Medina, WA (US); Nissanka Arachchige Bodhi Priyantha, Redmond, WA (US); Heitor Soares Ramos Filho, Ottawa (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 658 days.

(21) Appl. No.: 12/964,573

(22) Filed: Dec. 9, 2010

(65) Prior Publication Data

US 2012/0146850 A1    Jun. 14, 2012

(51) Int. Cl.
  *G01S 3/02* (2006.01)
  *G01S 19/09* (2010.01)
  *G01S 19/34* (2010.01)

(52) U.S. Cl.
  CPC .............. *G01S 19/34* (2013.01); *G01S 19/09* (2013.01)

(58) Field of Classification Search
  CPC ................................ G01S 19/34; G01S 19/09
  USPC .............................................. 342/357.46, 460
  See application file for complete search history.

(56) References Cited

U.S. PATENT DOCUMENTS

| | | | |
|---|---|---|---|
| 4,639,680 A * | 1/1987 | Nelson | 327/7 |
| 5,119,102 A * | 6/1992 | Barnard | 342/357.46 |
| 5,874,914 A * | 2/1999 | Krasner | 342/357.29 |
| 5,955,986 A | 9/1999 | Sullivan | |
| 6,104,338 A * | 8/2000 | Krasner | 342/357.24 |
| 6,417,801 B1 * | 7/2002 | van Diggelen | 342/357.62 |
| 6,466,164 B1 * | 10/2002 | Akopian et al. | 342/357.63 |
| 6,700,533 B1 | 3/2004 | Werb et al. | |
| 7,893,869 B2 * | 2/2011 | Gaal et al. | 342/357.21 |
| 2004/0027281 A1 * | 2/2004 | Akopian et al. | 342/387 |
| 2004/0176099 A1 * | 9/2004 | Sahai et al. | 455/456.1 |
| 2004/0192352 A1 | 9/2004 | Vallstrom et al. | |
| 2005/0206559 A1 * | 9/2005 | Diggelen et al. | 342/357.06 |
| 2008/0032706 A1 * | 2/2008 | Sheynblat et al. | 455/456.1 |
| 2009/0138477 A1 * | 5/2009 | Piira et al. | 707/10 |
| 2009/0278738 A1 | 11/2009 | Gopinath | |
| 2010/0302099 A1 * | 12/2010 | Grossnickle et al. | 342/357.46 |

OTHER PUBLICATIONS

Akopian, David et al., "A Fast Positioning Method Without Navigation Data Decoding for Assisted GPS Receivers", *IEEE Transactions on Vehicular Technology*, vol. 58, No. 8, Available at <http://ieeexplore.ieee.org/stamp/stamp.jsp?arnumber=04804761>,(Oct. 2009),pp. 4640-4645.

Batra, Isha "Energy efficient MAC protocols for Mobile Sensor Networks", *International Journal of Computer Applications (0975-8887)*, vol. 1, No. 24, Available at <http://www.ijcaonline.org/journal/number24/pxc387717.pdf>,(Feb. 2010),pp. 86-93.

(Continued)

*Primary Examiner* — Frank J McGue (57) ABSTRACT

This document describes various techniques for implementing low-energy GPS on a mobile device. A GPS module is activated, a sub-millisecond pseudo-range estimate is received from the GPS module, the GPS module is deactivated, the sub-millisecond pseudo-range estimate and a time stamp are transmitted to a remote entity, and location information based on the sub-millisecond pseudo-range estimate and time stamp is received from the remote entity.

6 Claims, 5 Drawing Sheets

(56) References Cited

OTHER PUBLICATIONS

Borre, Kai et al., "A Software-Defined GPS and Galileo Receiver: A Single-Frequency Approach", ISBN: 978-0-8176-4390-4, Available at <http://www.google.co.uk/url?sa=t&source=web&cd=5&ved=0CCwQFjAE&url=http%3A%2Fciteseerx.ist.psu.edu%2Fviewdoc%2Fdownload%3Fdoi%3D10.1.1.131.8844%26rep%3Drep1%26type%3Dpdf&ei=AOqrTMPUHoGUjAfQgpjMCw&usg=AFQjCNFz5kK4MdVpFeo5oYc32TqynHJRtQ>,(2007),6 pages.

Chandran, et al., "An Energy Efficient Localization Technique Using Particle Swarm Optimization in Mobile Wireless Sensor Networks", *American Journal of Scientific Research*, Issue 8, Available at <http://www.eurojournals.com/ajsr_8_05.pdf>,(2010),pp. 33-48.

Hsin, Chih-Fan et al., "Network Coverage Using Low Duty-Cycled Sensors: Random & Coordinated Sleep Algorithms", *In Proceedings of IPSN 2004*, Available at <http://citeseerx.ist.psu.edu/viewdoc/download?doi=10.1.1.11.268&rep=rep1&type=pdf>,(Apr. 2004),10 pages.

Lin, Kaisen et al., "Energy-Accuracy Aware Localization for Mobile Devices", *In Proceedings of MobiSys 2010*, Available at <http://research.microsoft.com/apps/pubs/default.aspx?id=120831>,(Jun. 2010),pp. 1-14.

Lu, Hong et al., "The Jigsaw Continuous Sensing Engine for Mobile Phone Applications", *In Proceedings of SenSys 2010*, Available at <http://www.cs.dartmouth.edu/~campbell/jigsaw.pdf>,(Nov. 2010),14 pages.

Paek, Jeongyeup et al., "Energy-Efficient Rate-Adaptive GPS-based Positioning for Smartphones", *In Proceedings of MobiSys 2010*, Available at <http://enl.usc.edu/papers/cache/Paek10a.pdf>,(Jun. 2010),16 pages.

Sirola, Niilo "A Method for GPS Positioning without Current Navigation Data", *Master's thesis, Department of Electrical Engineering, Tampere Univeristy of Technology*, Available at <http://math.tut.fi/posgroup/sirola_mscth.pdf>,(Sep. 20, 2001),52 pages.

Sun, Guolin et al., "Signal Processing Techniques in Network-aided Positioning", *IEEE Signal Processing Magazine*, Available at <http://www.cspl.umd.edu/sig/publications/sun_survey_200507.pdf>,(Jul. 2005),pp. 12-23.

Syrjarinne, Jari "Time Recovery through Fusion of Inaccurate Network Timing Assistance with GPS Measurements", *In Proceedings of Information Fusion 2000*, Available at <http://www.isif.org/fusion/proceedings/fusion00CD/fusion2000/papers/WeD5-1-JariSyrjarinne154.pdf>,(Jul. 2000),8 pages.

Van Diggelen, Frank "A-GPS: Assisted GPS, GNSS, and SBAS", *NavtechGPS*, Available at <http://www.navtechgps.com/Downloads/2463.pdf>,(2009),2 pages.

Zhuang, Zhenyun et al., "Improving Energy Efficiency of Location Sensing on Smartphones", *In Proceedings of MobiSys 2010*, Available at <http://www.deutsche-telekom-laboratories.com/~kyuhan/papers/MobiSys10Kim.pdf>,(Jun. 2010),15 pages.

\* cited by examiner

LOW-ENERGY GPS

BACKGROUND

Mobile devices often support services or applications that are location based. These location-based services and/or applications rely on location information for the mobile device. Location information can be obtained from a variety of sources including cell-tower identifiers, WiFi signatures, or a global positioning system (GPS). Although more accurate and reliable than other sources of location information, GPS receivers consume an inordinate amount of a mobile device's limited battery power. As such, GPS use in mobile devices is typically limited, forcing location-based services and applications to rely on less-accurate location information.

SUMMARY

This document describes various techniques for implementing low-energy GPS on a mobile device. These techniques may enable a mobile device to receive sub-millisecond pseudo-range estimates from a duty-cycled GPS module. The sub-millisecond pseudo-range estimates and a time stamp are transmitted to the cloud in response to which the mobile device receives location information or location-based services back from the cloud. By so doing, the techniques reduce an amount of energy consumed by the GPS receiver for determining a location of the mobile device or obtaining location-based services.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes various techniques for implementing low-energy GPS on a mobile device. Various embodiments of these techniques result in a GPS receiver of a mobile device consuming less energy, which allows the mobile device to use the GPS receiver without compromising battery life.

Example Environment

Figure 1:
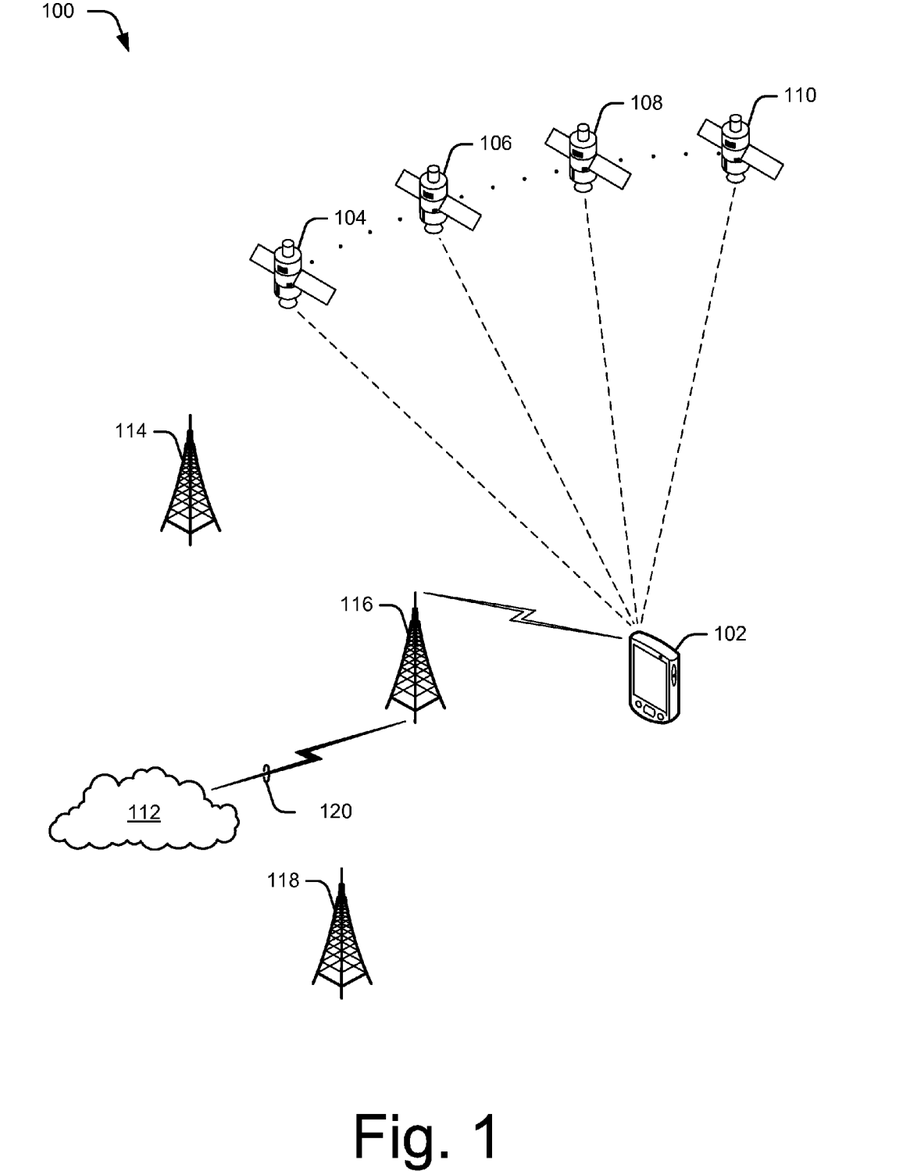
FIG. 1 illustrates an example environment in which these techniques may be performed.

FIG. 1 is an illustration of an example environment 100 in which techniques for low-energy GPS can be implemented. Environment 100 includes mobile device 102 and GPS satellites 104, 106, 108, and 110 from which mobile device may receive coded signals. Environment 100 also includes service cloud 112 and cell-towers 114, 116, and 118 through which mobile device 102 may communicate over a cellular network. Generally, mobile device 102 transmits and receives data to and from service cloud 112 through the cellular network associated with cell-towers 114-118. While not shown, mobile device 102 may communicate with service cloud 112 via other wireless networks, such as a wireless local-area-network (WLAN) or a short-range wireless network.

Mobile device 102 can be any GPS-enabled device capable of communicating data over a wireless network such as a cellular network. In the present example, mobile device 102 is illustrated as a smart-phone. While not shown, mobile device may comprise other devices, such as a laptop, tablet computer, personal navigation device, digital camera, or a personal media device to name a few.

GPS satellites 104-110 may comprise any of the satellites associated with the GPS satellite navigation (sat-nav) system. Additionally, although shown as four satellites, navigation satellites 104-110 represent any number of navigation satellites from which mobile device 102 can receive a GPS signal. GPS satellites 104-110 are uniquely identifiable by a pseudo-random noise (PRN) number, which corresponds to a unique spreading code used by a given satellite. Generally, GPS satellites 104-110 transmit GPS signals useful for geo-spatial positioning. The GPS signals are coded and include time-based information useful for calculating position. Mobile device 102 receives GPS signals from GPS satellites that are line-of-sight, although in some cases GPS signals received by mobile device 102 may be diffracted, reflected, and/or attenuated by various obstructions.

Cell-towers 114-118 may be associated with one or more cellular networks based on any suitable type of cellular technology. For example, cell-tower 116 can support cellular networks based on one or more technologies such as global system for mobile communications (GSM), code-division multiple access (CDMA), or Worldwide Interoperability for Microwave Access (WiMax) technologies, to name a few. In some cases, a cell-tower supports multiple generations of a wireless technology such as enhanced data GSM environment (Edge), high-speed packet access (HSPA), and 3G long term evolution (LTE) standards.

Cell-towers 114-118 may each have unique identifiers useful to distinguish each cell-tower for communicative purposes. Typically, cellular devices within a transmission cell (e.g. transmission range) of a cell-tower associate with that cell-tower. In some instances, a location of a cellular device associated with a cell-tower can be estimated using the cell-tower's unique identifier. For example, based on a unique identifier of cell-tower 116, a location for mobile device 102 could be estimated to within the transmission cell of cell-tower 116. Accuracy of a cell-tower identifier based location service may suffer due to the density of the cell-towers. For instance, a cell-tower identifier based location may exhibit an estimation error of several hundred meters.

Service cloud 112 provides web-based processing, services, data, and/or resources on demand over the Internet. For example, mobile device 102 can access service cloud 112 while communicating with cell-tower 116 via backhaul link 120. Backhaul link 120 can comprise any combination of core, backhaul, and/or operator network segments and/or layers for transporting data to and from the Internet.

Service cloud 112 can provide various services and/or information to mobile clients including location-based services. Location-based services may comprise, by way of example and not limitation, geo-tagging, geo-fencing, turn-by-turn navigation, augmented reality, position logging, proximity-based notifications, search, advertising, social networking, and/or fitness-tracking. In at least some instances, service cloud 112 provides services and/or information to mobile device 102 based on location information received from mobile device 102.

Service cloud 112 also has access to GPS-satellite-related information such as ephemeris and almanac data useful for determining a position of a receiver as described below. Because orbital characteristics of GPS satellites are generally well known, service cloud 112 can determine ephemeris and almanac data of a region for a given time.

Figure 2:
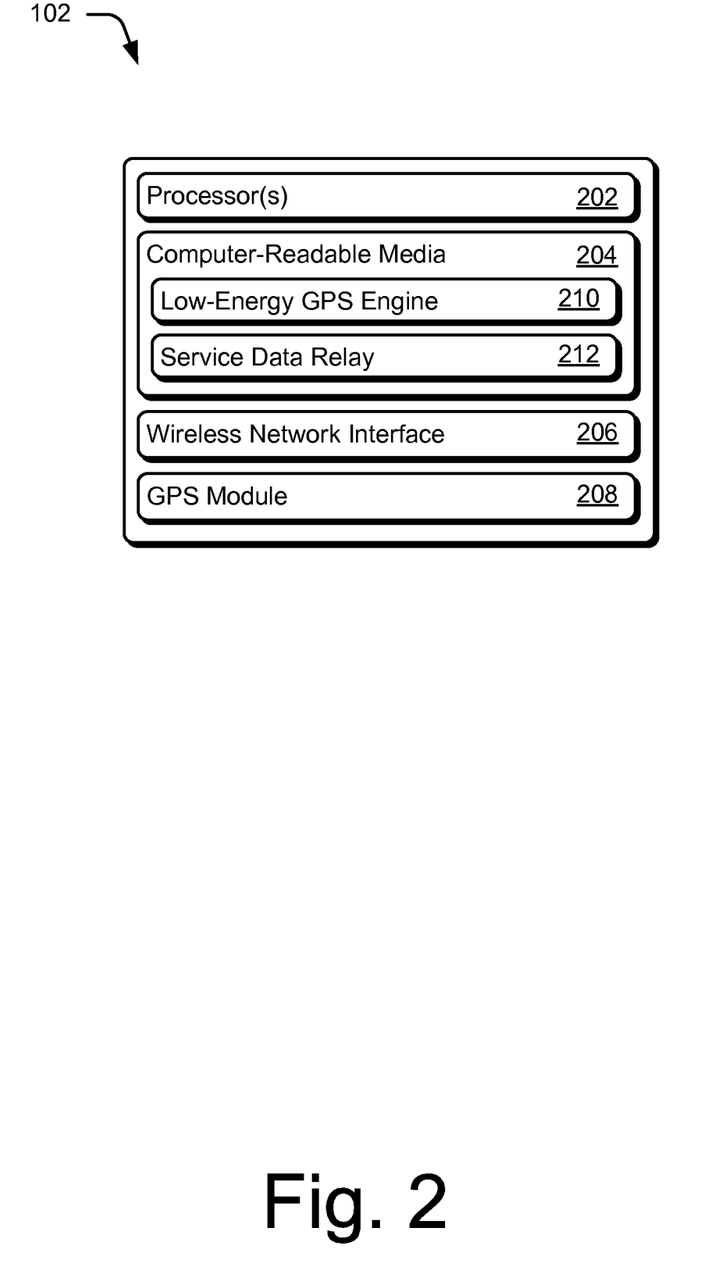
FIG. 2 illustrates an example of the mobile device of FIG. 1 in more detail.

FIG. 2 illustrates a detailed example of mobile device 102 of FIG. 1. Mobile device 102 includes processor(s) 202, computer-readable media (CRM) 204, wireless network interface 206, and GPS module 208. Computer-readable media 204 includes low-energy GPS engine 210 and service data relay 212. How low-energy GPS engine 210 and service data relay 212 are implemented and used varies and are described below.

Wireless network interface 206 can communicate over any suitable wireless network, such as those mentioned above. Although not shown, in at least some instances, mobile device 102 includes multiple wireless network interfaces. Mobile device 102 may include a cellular network modem, a short-range wireless radio module (e.g. Bluetooth), and a WLAN network adapter.

GPS module 208 is configured to receive GPS signals and is capable of determining a position of mobile device 102. Although shown as integrated with mobile device 102, GPS module 208 may be external, but local. An external GPS module may communicate with mobile device 102 over a wired (e.g. USB) or wireless interface (e.g. Bluetooth). In some cases, GPS module 208 is integrated with wireless network interface 206. This integrated module provides cellular connectivity and GPS functionality. In some cases, an antenna of the integrated module is shared by the cellular and GPS sub-systems.

GPS module 208 can be used to determine a position of mobile device 102 using signals received from GPS satellites 104-110. Determining a position using GPS module 208 can be separated into three separate phases: acquisition, tracking, and position calculation. The acquisition phase finds visible GPS satellites and rough values of the carrier frequency and coarse acquisition (C/A) code phase.

The tracking phase tracks the C/A code using a delay-lock-loop (DLL) correlating a C/A code of a received signal with a locally generated C/A code. During the tracking phase, sub-millisecond pseudo-ranges can be estimated by using code phase-shift of the C/A code. In some instances, GPS module 208 is configured to combine acquisition and tracking operations and provide sub-millisecond pseudo-ranges estimates. The tracking phase may also track carrier frequency and phase of the received signal. The position phase decodes the signals for navigation and time data, and then calculates full pseudo-range estimates to compute the GPS satellite orbits and position of GPS module 208.

Supplemental information can be used to decrease an amount of time to determine a position. For example, providing information such as ephemeris, almanac, timing, frequency, and/or position data to GPS module 208 may reduce a time-to-first-fix (TTFF) from one minute to about 1 second. The supplemental information can be stored or generated locally and/or received from an external source, such as a server.

Although described in respect to GPS, any of the techniques described herein may be implemented in association with other global or regional satellite navigation systems. In some cases, these techniques are used with sat-nay receivers capable of receiving signals from two or more satellite navigation systems. By way of example, other global and/or regional satellite navigation systems may include Global Navigation Satellite System (GLOASS), Galileo, Beidou, Compass, Indian Regional Navigation Satellite System (IRNSS), or Quasi-Zenith Satellite System (QZSS), to name a few.

Generally, any of the techniques and abilities described herein can be implemented using software, firmware, hardware (e.g., fixed-logic circuitry), manual processing, or any suitable combination of these implementations. The example mobile device 102 generally represents software, firmware, hardware or any combination thereof. In the case of a software implementation, for instance, low-energy GPS engine 210 and/or service data relay 212 represent computer-executable instructions (e.g., program code) that perform specific tasks when executed on a processor (e.g., CPU or CPUs). The program code can be stored in one or more computer-readable media devices, such as CRM 204. The features and techniques described herein are platform-independent, meaning that they may be implemented on a variety of commercial computing platforms having a variety of processors.

Example Processes

The following discussion describes techniques for implementing low-energy GPS on a mobile device. Generally, these techniques enable a mobile device to reduce energy consumption associated with a GPS module. By way of example, assume a user of mobile device 102 is requesting location information. GPS module 208 is activated and sub-millisecond pseudo-range estimates are received from GPS module 208. GPS module 208 is then deactivated and the sub-millisecond pseudo-range estimates are transmitted with a time stamp to service cloud 112. Service cloud 112 determines a position of mobile device 102 based the sub-millisecond pseudo-range estimates and the time stamp, with the assistance of an approximate location, which can be based on a cell-tower location, WiFi access point, or mobile device's past location. Service cloud 112 then transmits location information or location-based service data to mobile device 102 based on the determined position.

Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1 as well as entities of environment 100 illustrated in FIG. 2.

Figure 3:
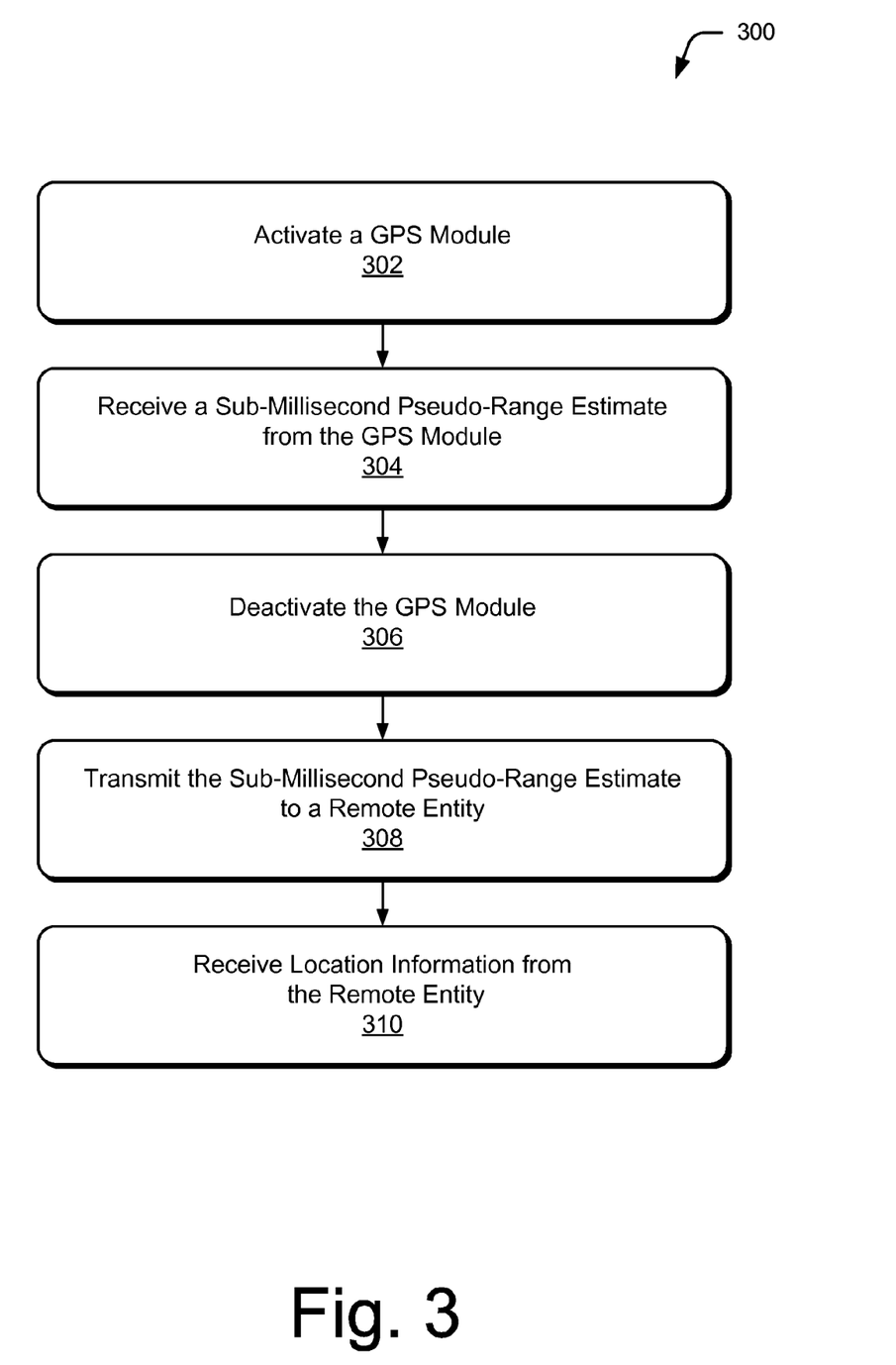
FIG. 3 is a flow diagram depicting an example process for receiving location information based on sub-millisecond pseudo-range estimates.

FIG. 3 is a flow diagram depicting an example process 300 for receiving location information based on sub-millisecond pseudo-range estimates. Block 302 activates, at a first point in time, a GPS module configured to receive GPS signals. In some cases, a time stamp indicates a time when the GPS signals are received. Generally, accuracy of the time stamp in relation to receiving the GPS signals is about two seconds or less. In some cases, the time stamp may be accurate to 10-20 milliseconds of when the GPS signals are received.

The time stamp may be provided using any suitable source such as a clock of a mobile device, a system clock of an operating system of a mobile device, a clock of the GPS module, or a time indicated by the GPS signals, to name a few. In some instances, a GPS module may output a precise clock output useful to synchronize a clock of a mobile device. In other instances, a mobile device is synchronized to a time system of a cellular network. For example, a time stamp is provided using a clock of a mobile device synchronized with a time system of a cellular network.

By way of example, consider process 300 in the context of operating environment 100. Low-energy GPS engine 210 of mobile device 102 activates GPS module 208 at a first point in time. Here assume that GPS module 208 receives signals from five GPS satellites such as GPS satellites 104-110. Also assume that mobile device 102 is synchronized with a time system of a cellular network associated with cell-tower 116 and that a time stamp for the received signals is based on this time system.

Block 304 receives a sub-millisecond pseudo-range estimate from the GPS module. The sub-millisecond pseudo-range estimate is based on the GPS signals received. Over time, sets of multiple sub-millisecond pseudo-range estimates may be received from the GPS module. In some instances, the sub-millisecond pseudo-range is estimated during the tracking phase by analyzing code phase-shift of the GPS signals. Multiple sub-millisecond pseudo-range estimates for a satellite can be received from the GPS module. In such a case, multiple sub-millisecond pseudo-range estimates for the satellite can be averaged to provide an average sub-millisecond pseudo-range estimate. A pseudo-random noise (PRN) number may also be associated with a received sub-millisecond pseudo-range estimate.

Continuing the ongoing example, low-energy GPS engine 210 receives sub-millisecond pseudo-range estimates from the GPS module 208. Here assume GPS module 208 is active for 11 milliseconds and that 11 sub-millisecond pseudo-range estimates are received.

At block 306, the GPS module is deactivated after receiving the sub-millisecond pseudo-range estimate at a second point in time. By so doing, energy can be conserved that would normally be consumed by continuously powering the GPS module. The time indicated by the time stamp of the received GPS signals occurs between the first and second points in time. A time between activating and deactivating the GPS module defines an active time during which the GPS module can receive GPS signals. Typically, the GPS module is active long enough to provide sub-millisecond pseudo-range estimates. For example, the GPS module may remain active for 500 milliseconds, 300 milliseconds, 100 milliseconds, 50 milliseconds, or 11 milliseconds in order to provide sub-millisecond pseudo-range estimates. Alternatively or additionally, the GPS module may be activated multiple times within an amount of time (e.g. 500 milliseconds) with each activation time being less than a few dozen milliseconds. The sub-millisecond pseudo-range estimate and time stamp are useful to determine a position of the GPS module.

Considerable energy can be saved by activating the GPS module for short amounts of time. For instance, a typical position query of a GPS module may consume about 7,000 millijoules (mJ) of energy. Activating a GPS module for 11 milliseconds to obtain sub-millisecond pseudo-range estimates for a position query may consume as little as 7.7 mJ of energy. As an example of potential energy savings, consider Table 1, which shows energy savings associated with various implementations of low-energy GPS.

TABLE 1

Position Query Energy Trade-Off

| Active Time (ms) | Energy (mJ) |
| --- | --- |
| 11 | 7.7 |
| 50 | 35 |
| 100 | 70 |
| 300 | 210 |
| 500 | 350 |
| Standard GPS | 7,000 |

In the context of the present example, low-energy GPS engine deactivates GPS module 208 at a second point in time. Here assume that the second point in time is 11 milliseconds after the first point in time.

Block 308 transmits the sub-millisecond pseudo-range estimate and the time stamp to a remote entity. The sub-millisecond pseudo-range estimate and the time stamp can be transmitted via any suitable wireless network, such as those described above. Additionally, transmitting the sub-millisecond pseudo-range estimate and the time stamp in free space of a packet queued for transmission may conserve transmission bandwidth. In various embodiments, block 308 may transmit multiple sub-millisecond pseudo-range estimates, an average sub-millisecond pseudo-range estimate, and/or PRN numbers associated with sub-millisecond pseudo-range estimates to the remote entity.

Energy is consumed when transmitting the sub-millisecond pseudo-range estimate(s) and the time stamp to the remote entity. The energy consumed by transmitting is often less than energy consumed by the GPS module, although in some cases, may be about equal to the amount of energy consumed by the GPS module energy. In such a case, transmitting the sub-millisecond pseudo-range estimate(s) and the time stamp may conserve only a minimal amount of energy. By transmitting multiple sets of sub-millisecond pseudo-range estimates and corresponding time stamps an additional amount of energy may be conserved.

Transmitting the sub-millisecond pseudo-range estimate(s) and the time stamp may require various amounts of transmission bandwidth. For example, sub-millisecond pseudo-range estimates from 11 milliseconds of received GPS signals (132 doubles), 12 PRNs (12 5-bit integers), and a time stamp (1 double) consume 539.5 bytes of bandwidth. Averaging the sub-millisecond pseudo-range estimates can reduce the amount of transmission bandwidth required. For instance, an averaged sub-millisecond pseudo-range estimate (12 doubles), 12 PRNs (12 5-bit integers), and a time stamp (1 double) consume 59.5 bytes of bandwidth. Additionally, block 308 may transmit the sub-millisecond pseudo-range estimate and the time stamp to the remote entity using free space of a data packet queued for transmission precluding the need to transmit an additional data packet.

Additionally, in some implementations, information relating to an approximate location is transmitted to the remote entity. Information relating to an approximate location may include a unique identifier of a cell-tower, a proximity to another mobile device, a media access control address of a WLAN access-point, previously received position information, and/or dead-reckoning navigation information from a previously known location, to name a few.

Continuing the ongoing example, service data relay 212 transmits the sub-millisecond pseudo-range estimates, the time stamp, and information relating to an approximate location over wireless interface 206 to cell-tower 116. Here assume that the information relating to the approximate location is a unique identifier of cell-tower 116. In the context of the present example, service cloud 112 receives the sub-millisecond pseudo-range estimates, the time stamp, and the unique identifier of cell-tower 116 via backhaul link 120.

Block 310 receives location information based on the sub-millisecond pseudo-range estimate and the time stamp from the remote entity. The location information may include positional coordinates, such as latitude/longitude or military grid reference system (MGRS), data associated with a location-based service, or data useful to a location-based application of a mobile device. The received location information can be exposed to services and/or applications of a mobile device for any suitable use. Operations of blocks 308 and 310 can provide location-based services in one round trip of communication with the remote entity, saving energy normally consumed by additional rounds of communication used in traditional methods of location-based services.

Concluding the present example, service data relay 212 receives latitude/longitude coordinates from service cloud 112. Here assume that mobile device 102 is running a mapping application. The mapping application of mobile device 102 updates a position of the mapping application based on the received latitude/longitude coordinates.

The operations of blocks 302, 304, 306, 308 and 310 may be repeated effective to receive additional location information based on subsequent sub-millisecond pseudo-range estimates. Repeating operations of at least blocks 302, 304, and 306 duty cycles a GPS module, allowing location information to be received while conserving energy.

Figure 4:
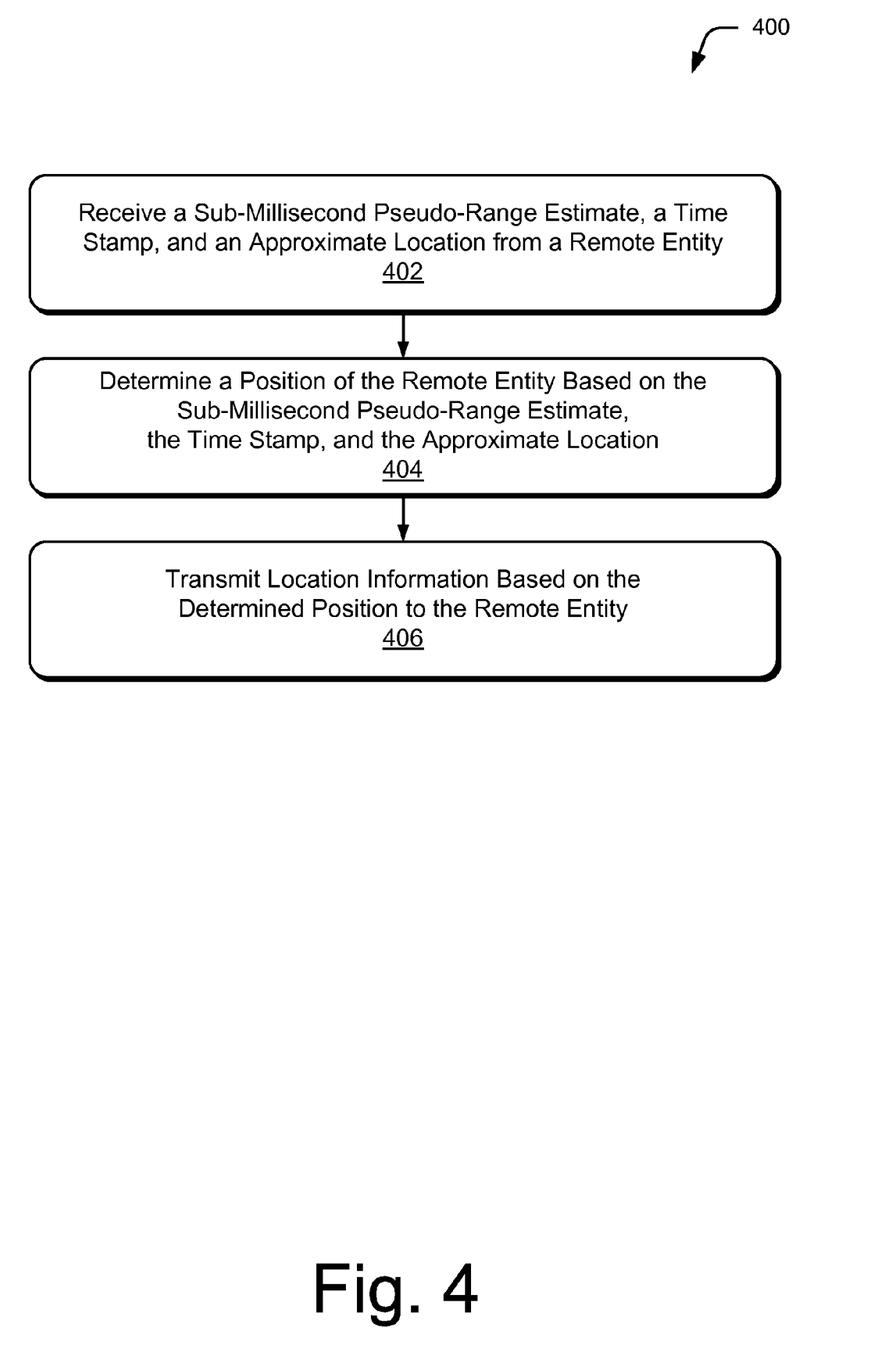
FIG. 4 is a flow diagram depicting an example process for providing location information based on pseudo-range sub-millisecond estimates.

FIG. 4 is a flow diagram depicting an example process 400 for providing location information based on pseudo-range sub-millisecond estimates. Block 402 receives a sub-millisecond pseudo-range estimate, information relating to an approximate location of the remote entity, and a time stamp from a remote entity. In some cases the sub-millisecond pseudo-range estimate is an average of a multiple sub-millisecond pseudo-range estimates. In other cases, multiple sub-millisecond pseudo-range estimates are received.

The information relating to an approximate location can include various information such as a previously determined position for the remote entity, a reference to a point of interest or landmark, a unique identifier of a cell-tower, or a media access control (MAC) address of a WLAN access-point, to name a few. The time stamp indicates when GPS signals associated with the sub-millisecond pseudo-range estimate are received by the remote entity. In at least some instances, the time stamp is generated and linked to the sub-millisecond pseudo-range estimate by the remote entity.

Consider process 400 in the context of the above-mentioned example. Service cloud 112 receives sub-millisecond pseudo-range estimates, a unique identifier of cell-tower 116, and a time stamp from mobile device 102 indicating when GPS signals associated with the sub-millisecond pseudo-range estimates are received. Here assume that a user of mobile device 102 is requesting information related to any proximate restaurants.

Block 404 determines a position of the remote entity based on the information relating to the approximate location of the remote entity, the sub-millisecond pseudo-range estimate, and the time stamp. In some cases, determining the position of the remote entity includes determining pseudo-ranges based on the information relating to the approximate location of the remote entity, the sub-millisecond pseudo-range estimate, and the time stamp. Once pseudo-ranges have been determined, the position of the remote entity can be computed.

In some cases, an approximate location (e.g. within 100 km) of the remote entity is determined using the information relating to the approximate location. This can be determined by consulting an index of cell-tower locations using the unique identifier of the cell-tower. Similarly, an approximate location of the entity can be determined by consulting an index of WLAN access-point locations using the MAC address of the WLAN access-point.

Pseudo-ranges for computing the position of the remote entity can be determined using the following equations. The transmission delay of the GPS signal is modeled in equations 1 and 2.

$$N^{(k)}+\phi^{(k)}=r^{(k)}-\delta_t^{(k)}+b+\epsilon^{(k)} \qquad \text{Equation 1}$$

$$N^{(k)}+\phi^{(k)}=\check{r}^{(k)}-d^{(k)}-\delta_t^{(k)}+b+\epsilon^{(k)} \qquad \text{Equation 2}$$

In the illustrated equations $N^{(k)}$ is the millisecond component of a pseudo-range for satellite k and $\phi^{(k)}$ is the sub-millisecond component. Additionally, $r^{(k)}$ is the actual geometric range from satellite k, $\delta_t^{(k)}$ is the satellite clock errors obtained from the ephemeris at the a priori coarse time for satellite k, b is the common clock bias range, and $\epsilon^{(k)}$ represents an unknown error in measurement. As $r^{(k)}$ is unknown, a substitution of $r^{(k)}=\check{r}^{(k)}-d^{(k)}$ is made in equation 2, where $\check{r}^{(k)}$ is the estimated pseudo-range from the a priori position at the coarse time of transmission and $d^{(k)}$ is the error in $\check{r}^{(k)}$. Next, a reference satellite, k=0, is chosen as shown in equation 3.

$$N^{(0)}+\phi^{(0)}=\check{r}^{(0)}-d^{(0)}-\delta_t^{(0)}+b+\epsilon^{(0)} \qquad \text{Equation 3}$$

$$N^{(k)}=N^{(0)}+\phi^{(0)}-\phi^{(k)}+(\check{r}^{(k)}-d^{(k)}-\delta_t^{(k)}+b+\epsilon^{(k)})-(\check{r}^{(0)}-d^{(0)}-\delta_t^{(0)}+b+\epsilon^{(0)}) \qquad \text{Equation 4}$$

Subtracting equation 2 from equation 3 results in equation 4, from which pseudo-range N for a given satellite k can be determined. Although values of $d^{(0)}$, $d^{(k)}$, $\epsilon^{(0)}$, and $\epsilon^{(k)}$ are not known, using the approximate location as an a priori location and the time stamp as an a coarse time, $N^{(k)}$ can be estimated by equation 5. In equation 5, the millisecond part of the pseudo-range for the reference satellite is substituted as $N^{(0)}=\text{round}(r^{(0)}-\phi^{(0)})$. Thus, the sub-millisecond pseudo-range value can be used to reconstruct the millisecond pseudo-ranges for the other satellites relative to the reference satellite.

$$N^{(k)}=\text{round}(N^{(0)}+\phi^{(0)}-\phi^{(k)}+(\check{r}^{(k)}-\delta_t^{(k)})-(\check{r}^{(0)}-\delta_t^{(0)})) \qquad \text{Equation 5}$$

Using the illustrated equations, a position of the remote entity can be determined with an approximate location, a coarse time, and sub-millisecond pseudo-range estimates from five or more GPS satellites. In at least some implementations, the cloud can determine a position of a remote entity using the equations illustrated above and coarse time (e.g. time stamp) in a least squares formulation. In some cases, a position of the remote entity can be determined in less than three microseconds. For example, an application programming interface (API) of a cloud's server may determine a position of a remote entity in less than three microseconds based on a set of sub-millisecond pseudo-ranges, a time stamp, and an approximate location. Alternately or additionally, multiples sets of sub-millisecond pseudo-range estimates, time stamps, and approximate locations may be batch processed when determining a position of a remote entity.

Continuing the ongoing example, service cloud 112 determines a position of mobile device 102 based on the sub-millisecond pseudo-range estimates, the unique identifier of cell-tower 116, and the time stamp from mobile device 102.

Block 406 transmits location information to the remote entity based on the determined position. The location information may include positional coordinates of the determined position, data associated with a location-based service, or information relating to entities proximate the determined position such as events, other mobile devices, restaurants, and/or entertainment venues, to name a few.

Concluding the present example, service cloud 112 transmits information relating to proximate restaurants to mobile device 102. The operations of blocks 402, 404, and 406 may be repeated, providing iterative location information to a remote entity, which can be useful for tracking or navigation services or applications.

Figure 5:
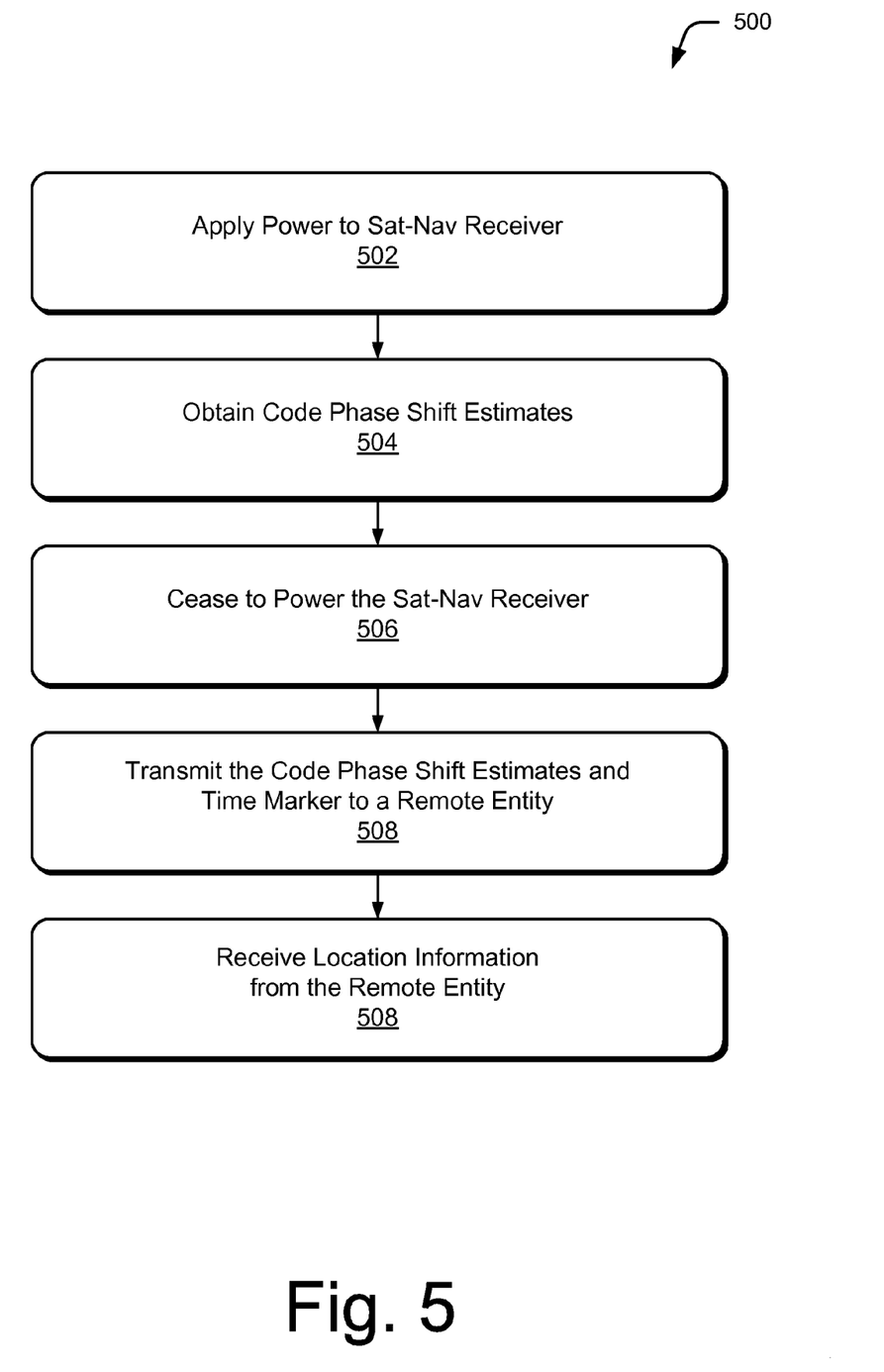
FIG. 5 is a flow diagram depicting an example process for receiving location information based on code phase-shift estimates.

FIG. 5 is a flow diagram depicting an example process 500 for receiving location information based on code phase-shift estimates. Block 502 applies power to a sat-nay receiver configured to receive sat-nay signals. A time that the sat-nay signals are received can be indicated by a time marker. Generally, the time marker indicates when the sat-nay signals are received to an accuracy of within two seconds. The time marker can be provided using any suitable timing source such as a clock of the sat-nay receiver or a mobile device associated with the sat-nay receiver.

Block 504 obtains code phase-shift estimates from the sat-nay receiver. Code phase-shift estimates correspond to transmission delay of the sat-nay signals and are useful for pseudo-range estimation. Code phase-shift can be estimated by a sat-nay receiver during acquisition and/or tracking phases. In some cases, the sat-nay receiver is configured to only perform the acquisition and tracking phases to conserve energy typically consumed by a position calculation phase.

Block 506 ceases to power the sat-nay receiver. By so doing, energy can be conserved that would normally be consumed by continuously powering the sat-nay receiver. In some cases, operations of blocks 502, 504, and 506 are performed repeatedly to duty cycle the sat-nay receiver. In such a case, an active time of the duty cycle is defined as a time occurring between operations of block 502 and block 506.

An inactive time of the duty cycle is then defined by a time occurring between operations of block 506 and subsequent operations of block 502. If the sat-nay receiver is duty cycled at less than about 10%, 90% of the energy typically consumed by continuously powering the sat-nay receiver can be conserved. In order to conserve even more energy, the sat-nay receiver can be duty cycled at about 1% with an active time of about 11 milliseconds or, in some cases, duty cycled as low as about 0.1% with an active period of about one millisecond.

In some cases, a period of the sat-nay receiver's duty cycle is set based on a location-based service or application's expected update frequency for location information. Setting the period of the duty cycle to correspond to a minimum update frequency for location information can conserve energy by powering the sat-nay receiver as needed to provide updated location information. A period of the duty cycle can be set to about one second for a location-based service with a location information update frequency of one Hz.

The expected update frequency for location information may be based on movement of the sat-nay receiver. A stationary or slowly-moving sat-nay receiver may have a duty cycle period of about 10 seconds to further reduce energy consumed. Alternately, a sat-nay receiver accelerating or moving at a high velocity may have a duty cycle of about one second or less. As a rate of movement of the sat-nay receiver changes, the duty cycle can be set accordingly to conserve energy while providing sufficient location information for a location-based service or application.

Block 508 transmits the code phase-shift estimates and the time marker to a remote entity. Additionally, in at least some cases, block 508 transmits information relating to an approximate location of the sat-nay receiver to the remote entity. The information relating to an approximate location can be based on various sources including previously received location information, a unique identifier of a cell-tower, or a MAC address of a WLAN access-point, to name a few.

Block 510 receives location information from the remote entity based on the code phase-shift estimates and the time marker. Additionally, in at least some cases the location information is also based on the information relating to an approximate location transmitted to the remote entity, which may include positional coordinates or data related to a location-based service or location-based application.

Conclusion

This document describes various techniques for enabling low-energy GPS on a mobile device. By so doing, these techniques allow a mobile device to use a GPS module without compromising battery life of the mobile device. Location information can be received from the cloud based on sub-millisecond pseudo-range estimates obtained from a GPS module having a small duty cycle. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, in one or more data packets from a remote entity and based on a minimum update frequency of location information to which the one or more data packets correspond, a sub-millisecond pseudo-range estimate associated with GPS signals received by the remote entity, a time stamp provided from the remote entity and corresponding to the sub-millisecond pseudo-range estimate that indicates when the GPS signals were received by the remote entity, and information relating to an approximate location of the remote entity, the minimum update frequency of the location information indicating a period of time for the remote entity to duty cycle a GPS module;
determining a position of the remote entity based on the information relating to the approximate location of the remote entity, the sub-millisecond pseudo-range estimate, and the corresponding time stamp; and
transmitting the location information to the remote entity based on the determined position.

2. The method as recited in claim 1, wherein the sub-millisecond pseudo-range estimate is an average of sub-millisecond pseudo-range estimates.

3. The method as recited in claim 1, wherein the act of receiving receives a plurality of sub-millisecond pseudo-range estimates.

4. The method as recited in claim 1, wherein the information relating to an approximate location is based on a previously determined position, a unique identifier of a cell-tower, or a media access address of a wireless network access-point.

5. The method as recited in claim 1, wherein the location information includes positional coordinates of the determined position of the remote entity or information associated with a location-based service.

6. The method as recited in claim 1, wherein the location information is information relating to entities proximate the determined position of the remote entity.

* * * * *